United States Patent
Behringer et al.

(10) Patent No.: US 9,043,884 B2
(45) Date of Patent: May 26, 2015

(54) AUTONOMIC NETWORK PROTECTION BASED ON NEIGHBOR DISCOVERY

(71) Applicant: Cisco Technology, Inc., San Jose, CA (US)

(72) Inventors: Michael Behringer, Mougins (FR); Yves Hertoghs, Brabant (BE); Bruno Klauser, Zurich (CH); Steinthor Bjarnason, Akershus (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/750,542

(22) Filed: Jan. 25, 2013

(65) Prior Publication Data

US 2014/0215580 A1 Jul. 31, 2014

(51) Int. Cl.
*H04L 29/06* (2006.01)
(52) U.S. Cl.
CPC .................... *H04L 63/105* (2013.01)
(58) Field of Classification Search
CPC ... H04L 63/20; H04L 63/0823; H04L 63/102; H04L 63/168; H04L 63/164
USPC ........................................................ 726/4–6
See application file for complete search history.

(56) References Cited

U.S. PATENT DOCUMENTS

| 6,012,088 | A  | * | 1/2000  | Li et al. ........................ 709/219 |
| 6,801,777 | B2 | * | 10/2004 | Rusch ........................ 455/452.2 |
| 7,639,688 | B2 |   | 12/2009 | Filsfils et al. |
| 2004/0208195 | A1 | * | 10/2004 | Kim et al. ..................... 370/463 |
| 2006/0077945 | A1 | * | 4/2006  | KethiReddy et al. ......... 370/346 |
| 2007/0101400 | A1 | * | 5/2007  | Freeman et al. ................ 726/2 |
| 2008/0028436 | A1 | * | 1/2008  | Hannel et al. .................... 726/1 |
| 2008/0086760 | A1 | * | 4/2008  | Jiang et al. ....................... 726/3 |
| 2008/0146341 | A1 | * | 6/2008  | Hill et al. ........................ 463/42 |
| 2012/0144494 | A1 | * | 6/2012  | Cole et al. ...................... 726/25 |
| 2012/0240212 | A1 | * | 9/2012  | Wood et al. ..................... 726/10 |
| 2013/0159021 | A1 | * | 6/2013  | Felsher ............................ 705/3 |
| 2013/0318570 | A1 | * | 11/2013 | L. et al. ............................ 726/4 |

OTHER PUBLICATIONS

T. Narten et al., Neighbor Discovery SEND; RFC 3971, Mar. 2005, Internet Engineering Task Force (IETF).*
Narten et al, Neighbor Discovery for IP version 6, Network Working Group, rfc4861, Sep. 2007,Internet Engineering Task Force (IETF).*
Arkko et al, Securing IPv6 neighbor and router discovery, ACM, 2002, pp. 1-10.*
Jajszczyk et al, Automatically switched optical networks: benefits and requirements, 2005, IEEE, vol. 43 Issue:2, pp. 1-10.*

(Continued)

*Primary Examiner* — Bradley Holder
*Assistant Examiner* — Ali Shayanfar
(74) *Attorney, Agent, or Firm* — Lempia Summerfield Katz LLC

(57) ABSTRACT

In one implementation, security configuration is automated based on information gathered using autonomic neighbor discovery. The neighbor discovery establishes a realm of trust between neighbors, such as determining that some neighbors may be trusted and others may not be trusted. A dynamic security barrier is created using the trust where devices on the network border protect the entire network. Differences in trust result in differential security configuration.

18 Claims, 5 Drawing Sheets

| Device Identity | Certificate | Valid | Timing | Discovery Method |
|---|---|---|---|---|
| X17.cisco.com | X.509.Cert | Valid | 1/1/11 11:11:11 | AN SEND |
| Y2.cisco.com | X.509.Cert | Valid | 1/1/11 11:11:15 | AN SEND |
| M.webex.com | SUDI | Valid | - | L2 Discovery |

(56) References Cited

OTHER PUBLICATIONS

Alsa'deh et al, Secure Neighbor Discovery: Review, Challenges, Perspectives, and Recommendations, 2012, IEEE vol. 10, Issue: 4, pp. 26-34.*
U.S. Appl. No. 13/748,030.
U.S. Appl. No. 13/477,913, filed May 22, 2012.
"IEEE 802.1X," webpage, Wikipedia, http://en.wikipedia.org/wiki/IEEE_802.1X, pp. 1-7, May 22, 2012.
"IEEE 802.1X-2004—Port Based Network Access Control," webpage, http://www.ieee802.org/1/pages/802.1x-2004.html, pp. 1-3, May 22, 2012.
"Secure Neighbor Discovery Protocol," webpage, Wikipedia, http://en.wikipedia.org/wiki/Secure_Neighbor_Discovery_Protocol, pp. 1-2, May 22, 2012.
"Neighbor Discovery for IP version 6 (IPv6)," webpage, http://tools.ietf.org/html/rfc4861, pp. 1-97, May 22, 2012.
"Cisco Discovery Protocol," webpage, Wikipedia, http://en.wikipedia.org/wiki/Cisco_Discovery_Protocol, p. 1, May 22, 2012.
"Link Layer Discovery Protocol," webpage, Wikipedia, http://en.wikipedia.org/wiki/Link_Layer_Discovery_Protocol, pp. 1-3, May 22, 2012.
"Routing Protocol Security Requirements (rpsec) (concluded WG)," webpage, http://datatracker.ietf.org/wg/rpsec/charter/, pp. 1-2, May 22, 2012.
"Neighbor Router Authentication: Overview Guidelines," webpages, Cisco IOS Security Configuration Guide, http://www.cisco.com/en/US/docs/ios/12_2/security/configuration/guide/scfroutr.html, pp. 1-5, May 22, 2012.
"The Public Key Infrastructure Approach to Security," Oracle9i Security Overview, Release 2 (9.2) Part No. A96582-01, © 2001-2002 Oracle Corporation, 8 pages; http://docs.oracle.com/cd/B10500_01/network.920/a96582/pki.htm.
Cisco Systems, Inc., "Unique Device Identifier Retrieval," © 2003-2006 Cisco Systems, Inc., 12 pages; http://www.cisco.com/en/US/docs/ios/12_3t/12_3t4/feature/guide/gtpepudi.html.
Cisco, "Understanding Cisco TrustSec," Revised Jun. 16, 2011, 10 pages; http://www.cisco.com/en/US/docs/switches/lan/trustsec/configuration/guide/arch_over.html.
Cooper, et al., "Internet X.509 Public Key Infrastructure Certificate and Certificate Revocation List (CRL) Profile," Network Working Group RFC 5280, May, 2008, 166 pages; http://www.ietf.org/rfc/rfc5280.txt.
Interopnet Labs, "What is EAP-FAST?" InteropNet Labs Full Spectrum Security Initiative (May 2005), 1 page; http://www.opus1.com/nac/whitepapers-old/e-eapfast-lv05.pdf.

\* cited by examiner

| Device Identity | Certificate | Valid | Timing | Discovery Method |
|---|---|---|---|---|
| X17.cisco.com | X.509.Cert | Valid | 1/1/11 11:11:11 | AN SEND |
| Y2.cisco.com | X.509.Cert | Valid | 1/1/11 11:11:15 | AN SEND |
| M.webex.com | SUDI | Valid | - | L2 Discovery |

AUTONOMIC NETWORK PROTECTION BASED ON NEIGHBOR DISCOVERY

TECHNICAL FIELD

This disclosure relates in general to the field of computer networks and, more particularly, to securing a computer network.

BACKGROUND

Network devices are designed to interoperate with each other in networks to carry services. The network devices and the network formed with the network devices may be susceptible to various types of attacks. Due to the variety of types of attacks, sources of attacks, and complexity of the network, it is operationally difficult to protect against attacks. To protect the network and network devices, a number of features are configured manually, such as control plane protection, infrastructure access control lists, management plane protection, and rate limiting.

Securing the network is expensive. For example, a control plane policing configuration may include an administrator created complex configuration file with hundreds of components identifying network components and settings. To protect internal components of a network from external attacks, routing information may be used to classify internal and external traffic. External traffic to internal network devices is blocked. The classification may be established manually. IEEE 802.1x uses a protocol to apply a policy for security allowing a device to connect to the network. However, the policy is constructed by and enforced using a centralized server. The result is manual configuration of different approaches. As the network changes, these defense mechanisms usually need to be adapted, leading to even higher operational load.

Manual configuration may be avoided, such as where security is configured automatically. The network generates one or more default configurations that are accepted by the nodes of the network. However, the default configuration of security may be overly restrictive for some interfaces since the connection established with the interface may not be known in advance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Figure 1:
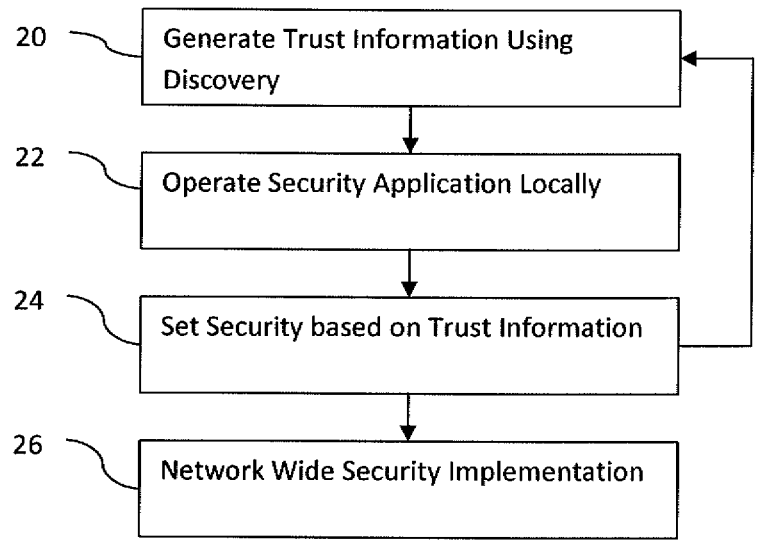
FIG. 1 is a flow chart diagram of one embodiment of a method for autonomic protection based on neighbor discovery.

Security configuration is automated based on information gathered using autonomic neighbor discovery. The neighbor discovery establishes a realm of trust between neighbors, such as determining that some neighbors may be trusted and others may not be trusted. A dynamic security barrier is created using the trust where devices on the network border protect the entire network. Differences in trust result in differential security configuration.

In an autonomic network, an adhoc network is created and secured automatically or with little or no manual configuration. The intelligence of networking is provided on the network devices. Each network component self-manages in autonomic networks. Autonomic networking relies on the components themselves, and greatly simplifies the interface to the operator and network management system. The intelligence used in the components provides the relevant best practices and keeps the network components up to date, without the need for human intervention. A default configuration is used and accepted by the nodes of the network.

The autonomic network devices establish security based on neighbor discovery. Neighbor discovery is used to create a generic trust database for use by the security and other applications. Each device uses neighbor discovery to discover its neighbors. During neighbor discovery, each device regularly sends out credentials to other devices. The receiving devices perform classification and validation of the credentials of the neighboring devices. The credentials and validation results are stored locally without having to perform a separate authentication for other applications. The trust database is created and maintained as a neighbor table with the results of the validation.

The default security configuration accounts for different security needs. The security distinguishes between different levels of trust, such as internal and external network connections, optimizing the security and reducing hindrance of internal network traffic. Internal and external attacks may be accounted for as appropriate, resulting in different security depending on the trust. The generic trust database is consulted for security. The neighbor discovery may use any of various underlying protocols, but the resulting table unifies the results such that security configuration may take advantage of the secured identity. Discovery, validation, and establishing security may be implemented locally without relying on centralized servers and/or without relying on routing tables. Manual configuration may be avoided. The security appropriate for an interface is provided rather than per-device basis. The security dynamically adjusts to changes in connections rather than being static and requiring manual adjustment.

Holistic network protection is automated in order to make the network devices unreachable against external and internal attacks. Information may be shared between network devices, resulting in a network-wide security instead of node-specific security.

In one example, a device is surrounded by other devices where all devices are part of the domain "lsk-iplaw.com." The devices on the edge establish a security barrier on the interfaces facing external devices (e.g., interfaces with another network, such as "cisco.com"). The interfaces facing the device in the middle are not protected or are protected differently. The device in the center would not establish any external barriers on its own, but provides only the internal level of security. If for some reason, the topology changes such that the device in the middle has a direct connection to the edge or an external device, the device in the middle detects the change by periodic neighbor discovery. The interface previously classified as "inside" is then automatically classified as "outside," and a security barrier appropriate for an external connection is established without user configuration. If one or more of the external devices do not support adjacency discovery (e.g., legacy device in an otherwise autonomic network), the devices in the network may treat the interface with that device as external unless manually overridden.

A shield is built around the network in a fully automated fashion. The shield is based on automatic discovery of trusted neighbors. The network automatically adapts the security barrier to changes in the network topology (e.g., adding/removing devices). At the same time, the network protects less capable devices on the inside of the network by dropping traffic destined to the less capable devices at the external interfaces.

FIG. 1 shows a method for autonomic network protection using neighbor discovery. The method is implemented by the network devices 12 of FIG. 6, the network device 70 of FIG. 7, or other devices. For example, the processor 70 performs the acts 20, 22, 24, and 26. Additional, different, or fewer acts may be provided, such as implementing act 20 with the acts of FIG. 2. The acts are performed in the order shown or a different order.

In act 20, trust information is generated using neighbor discovery. Any type of trust information may be generated, such as type of certificate, certificate validity, password comparison, shared-key, timing of checks, updating, type of discovery, and/or revocation. New, or one or more network devices are pre-commissioned with a secure domain identifier, which proves membership with the network or domain (e.g., Isk-iplaw.com). In one embodiment, the neighbor discovery disclosed in U.S. Published patent application Ser. No. 2013/031,8343, (Ser. No. 13/478,030) is used.

To establish communications, a neighbor discovery protocol (NDP) of the Internet protocol suite is performed, such as IPv6 SEND or other layer two or three discovery. The NDP operates in the Internet layer of the Internet model, but may operate in other layers. The NDP is responsible for address auto configuration of network devices 12, discovery of other network devices 12 on each link, determining the link layer (layer 2) addresses of other network devices 12, duplicate address detection, finding available routers and domain name system (DNS) servers, address prefix discovery, and/or maintaining reachability information about the paths to other active neighbor network devices 12. In an embodiment using IPv6, the neighbor discovery may include different ICMPv6 packet types to perform functions, such as packets for router solicitation, router advertisement, neighbor solicitation, neighbor advertisement, and/or redirect. Other embodiments and corresponding packets may be used, such as for an address resolution protocol, the Internet control message protocol, router discovery protocol, and/or router redirect protocol. Other neighbor discovery protocols or techniques may be used.

Figure 2:
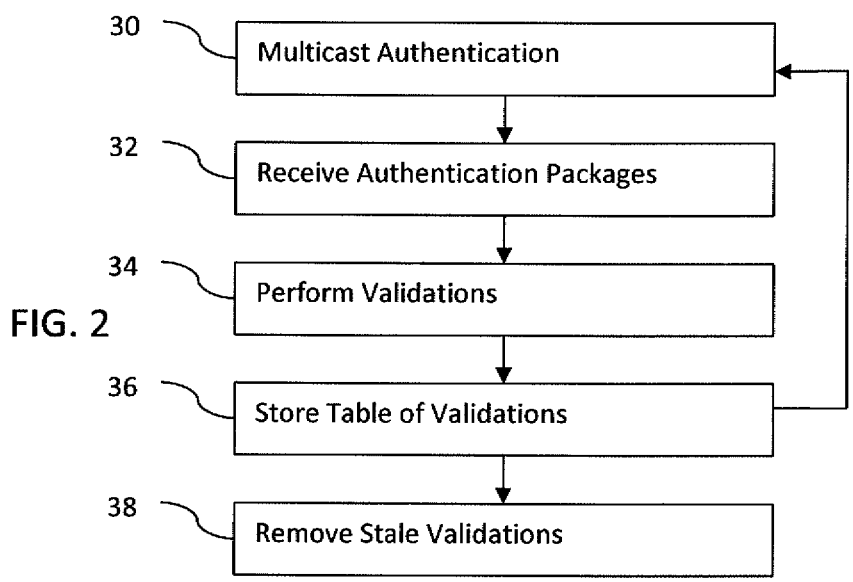
FIG. 2 is a flow chart diagram of an embodiment of a method for using neighbor discovery to create trust information for securing a network.

Trust information about other devices is generated at a local device. Each or a sub-set of the network devices in a network creates trust information for neighbors of the corresponding device. Each network device establishes trust information for its neighbors. Local device is used to indicate a network device establishing trust with neighboring devices. The discussion below for FIGS. 1 and 2 is for a given local device. Other network devices operate in the same or different manner.

Devices connect through interfaces. A given local device may have multiple interfaces. The trust of the neighbor or neighbors connected at a given interface is determined. The trust for each interface is determined.

To maintain security during commissioning or when a network device is added, network traffic is blocked prior to establishing the level of trust and corresponding level of security. During neighbor discovery, packets other than for authentication (e.g., neighbor discovery) and administrator defined network protocols are not received, not operated on, or otherwise blocked. The administrator may manually indicate one or more protocols to operate in the unsecured environment. Only after security is established are other types of network traffic possible not blocked, depending on the security.

FIG. 2 shows one embodiment for implementing act 20 of FIG. 1. Additional, different, or fewer acts may be used. The acts are performed in the order shown or a different order. The receiving of act 32, determining validation of act 34, and storing of act 36 are performed locally at each or some of the neighbor network devices. Each local device performs acts 32, 34, and 36, but some local devices may not. The local devices also multicast in act 30 to any neighboring devices. The neighboring devices receiving the multicast authentication perform as local devices.

In general, for each autonomic device in the network, neighbor discovery is done on all interfaces. The information gathered is validated and the results are stored in the autonomic network (AN) neighbor table. A new device automatically, without any human intervention, is provisioned with a certificate. The new device uses adjacency discovery to both announce it's presence on the network and also receive information about other devices. If a device which already belongs to a domain detects a new device which does not belong to any domain, the device will pass on the device's device credentials (UDI or SUDI (manufacturing certificate)) to the domain registration authority, such as an autonomic network registration authority (ANRA). The ANRA will decide using local information/policies and information from a central authority at Cisco, if the new device should be allowed to join the domain. If the ANRA decides to do so, it issues a domain certificate to the new device. The new device installs the domain certificate and then will use that subsequently in adjacency discovery. The certificate proves the device identity within a specific domain (e.g., Isk-iplaw.com).

In act 30, authentication or neighbor discovery packets are multi-cast from a local device. The neighbor discovery package is sent or multicast from the ports and/or over links to the neighboring network devices. Depending on the underlying network technology, one or more discovery methods might be initiated. For example, in autonomic networking (AN), the neighbor discovery process sends out a discovery packet to all local neighbors by sending the packet to the IPv6 link-local "all-nodes" multicast address. The neighbor discovery package may be transmitted from fewer than all of the ports or links. The package is transmitted in general or without specifically addressing other devices. Alternatively, single or directed transmission of the package is used.

The neighbor discovery occurs without request, such as periodically (e.g., every thirty seconds) transmitting neighbor discovery packages. Any time period may be used. Rather than multi-casting, a request and response or polling arrangement may be used.

The neighbor discovery package is included as part of neighbor discovery. The neighbor discovery is implemented at layers 2 or 3 of the TCP/IP stack. The neighbor discovery package is included with router solicitation, router advertisement, neighbor solicitation, neighbor advertisement, and/or redirect packages. For example, IPv6 secure neighbor discovery (SEND) is used to verify the authenticity of IPv6 router advertisement messages as well as validate messages from a neighbor device. The neighbor discovery package is a generic mechanism to transmit credentials to neighbors and receive credentials from neighbors. The neighbor discovery package may be sent as part of another neighbor discovery protocol with the same or different security, such as Internet security protocol (IPsec). The neighbor discovery package may be transmitted as part of a layer 2 or layer 3 protocol other than neighbor discovery.

Other example neighbor discovery protocols include multicast and single-hop protocols (e.g., IPV6 Neighbor Discovery, Cisco Discovery Protocol (CDP), Link Layer Discovery Protocol Media Endpoint Devices (LLDP-MED), Bonjour, Universal Plug and Play (UPnP), or Service Advertisement Framework (SAF)). Any neighbor discovery may be used or a separate protocol can be used.

The neighbor discovery package includes any desired information or credentials to be used for authentication. For example, the payload includes a certificate, key, shared-information, identification (UDI), or other information. Key encrypted information, a nounce, token, or other information for verifying identity may be included. In one embodiment, a device includes a secure form of authentication credentials, such as a domain-specific X.509 certificate, key, or other cryptographic information. The certificate is assigned to the device and binds the device identity and the domain identity together by creating an authorization token. The token is signed with a trusted private key. The token is stored as credentials by the device for transmission as the authentication information. The respective credentials are stored on the neighboring devices and received by any given local device for validation.

In one embodiment, the neighbor device has an electronically stored credential (e.g., manufacturing installed credential) to provide a level of trust between the device and a manufacturing service. The credential enables the device to trust a manufacturer service and vice-versa. In one example embodiment, the manufacturing installed credential may be an Institute of Electrical and Electronics Engineers (IEEE) 801.1AR initial device identifier (IDevID), or any other similar instantiation. The manufacturing installed credential is also referred to herein as a secure unique device identifier (secure UDI or 'SUDI'). A UDI can include a product identifier (PID), a version identifier (VID), and/or a serial number (SN) of the new device. Either a secure UDI or an unsecured UDI may be used as or provide as part of the credential for the neighbor discovery package.

In act 32, one or more neighbor discovery packages transmitted by neighboring devices are received by a local device. Different local devices receive the packages of the network devices neighboring the local device. A network device receives neighbor discovery packages for neighboring devices. The network device uses information from the neighbors for discovery and authentication. The network device receives information from any neighbor devices configured to transmit authentication information. All, multiple, one, or no neighbor devices may provide the authentication information. Where multi-casting is used, the neighbor discovery packages of neighbor network devices are received in or during the neighbor discovery operations. When a device wakes up and/or on a regular basis, the device performs neighbor discovery on all active interfaces using a set of pre-defined neighbor discovery algorithms.

The adjacency protocol operates on one or more layers in the stack, such as layer 2 or layer 3. Neighbor discovery packages from the neighbor network devices are received at layer 2 such that the neighbor network devices are directly linked to the computer network device. At layer 2 for autonomic networking, neighbor discovery is performed between two autonomic devices across the L2 link that interconnects them. In alternative embodiments, the packages are routed over any number of hops, such as associated with layer 3 messaging. At layer 3 for autonomic networking, neighbor discovery is performed between two autonomic L3 nodes or autonomic hosts across a layer 2 domain that interconnects them. This allows two such autonomic nodes to discover each other across a non-autonomic L2 network. Another use-case is to allow two autonomic routers to find out that both routers are connected to the same autonomic L2 portion of the network. An autonomic device accepts the packets associated with the neighbor discovery process, even on "external" interfaces, where by definition all dataplane traffic is dropped on ingress.

Neighbor discovery packets may be secured. Securing may allow for origin verification. The origin of a neighbor discovery packet is cryptographically verified. For example, the credentials of that neighbor are used to sign parts of the packets, or the entire packets. The packet may include a nonce or time stamp to guarantee freshness. Integrity violation detection may be used to avoid modification of the packet. Since it is not assumed that neighbor discovery packets carry confidential information, confidentiality protection (encryption) may not be required.

To allow for neighbor discovery, neighbor discovery traffic is accepted. Other network traffic, with or without any automatic or manually configured exceptions, is blocked. Other communications from neighboring devices are not accepted, processed, or operated on (e.g., are dropped). Since autonomic devices are open on all interfaces to receive neighbor discovery packets, protection against distributed denial of service using discovery packets is provided. Any counter measure may be used, such as a rate limiter per interface or shutting down any assaulted interface for a period of time if the limiter is not sufficient. The shut down may happen just if the device is not capable of handling the load (e.g., when the CPU load is over a certain threshold (say, 80%)).

For autonomic networking, the adjacency protocol includes a protocol version. A version number is exchanged in the neighbor discovery process to indicate the version of the protocol. The version number may be used to establish communications and/or processes for neighbor discovery. The version number may be stored, such as where the version of the protocol may indicate a level of trust.

The adjacency protocol includes a domain identity. The exchange of domain information is provided. A subset of a domain may be supported (e.g., for domain cisco.com, providing building24.cisco.com, or marketing.cisco.com). Every autonomic device is part of one single domain only. A new device initially is not part of any domain. New devices participate with a default (empty) domain name and their device ID (UDI).

The discovery may include capability information. The devices may announce their capabilities, for example whether a device has a routing functionality, whether the device may act as a management station, whether the device may act as an autonomic network registration authority (ANRA—a device that controls admission of new devices to an autonomic domain and provides the new devices with domain identities), and the type of autonomic control plane supported. New capabilities may be added to the neighbor discovery packet without changing the protocol or the protocol version. The neighbor discovery capabilities field is used to announce those capabilities for determining the next steps, such as announcing that a certain management station is not capable of doing the capability exchange step or a host does not support a specific type of the autonomic control plane (ACP).

If an adjacent device does not support autonomic behavior, no response to a neighbor discovery message may be received. The recognition of whether a neighbor is autonomic is implicit, not explicit in the protocol. It is possible that there is no response on any interface. In that case, alternative ways to reach potential neighbors are attempted, in sequence. For example, specific L2 settings (e.g., VLAN IDs, or DSL parameters) are attempted. Different parameters or methods may be attempted. If all fail, the process is repeated. This approach allows finding neighbors in different ways, adapting automatically to various network types.

The received neighbor discovery package is used to validate the corresponding network device in act 34. The network device determines a level of validation of each of the neighbor network devices from the neighbor discovery packages. Level indicates type of validation, results of validation, or other indication of values of trust information.

In one embodiment, the validation and corresponding creation of trust information is performed as disclosed in U.S. Published patent application Ser. No. 2013/031,8570,(Ser. No. 13/477,913). In general, autonomic devices build a database of neighbors discovered using adjacency discovery (AD). The database is used by the security protocol to establish security for interfaces with neighbor devices. The neighbor information may be periodically refreshed and validated, resulting in up-to-date information about neighbors and how the neighbors were authenticated, allowing for dynamic changes to the security settings.

The authentication credentials are extracted by the local device from the neighbor discovery package. The payload and any header information used for authentication are identified. The payload from the received neighbor discovery packets of other devices is extracted.

The extracted credentials are validated. Various types of validation may be used. Certificates signed by the domain root may be used to validate certificates of a same domain. The domain hash in the package is the hash of the domain root public key data. The root credential is matched to the domain hash. Thus, the domain hash extracted from the package is used to verify the signature. For example, X.509 certificate validation is performed. To validate the certificate, a certificate that matches the issuer of the received certificate is stored in the local device. First, the local device verifies that the certificate of the neighbor device is the appropriate type. For example, a value of an attribute in the X.509v3 extension section is inspected. Then, the public key from the stored certificate is used to decode the signature on the certificate from the neighbor device to obtain a MD5 hash, which must match an actual MD5 hash computed over the rest of the certificate. Other cryptographic validation may be used, with or without calls to a centralized server.

Password-based or manually configured lists may be used for validation. The credentials may include a password or identifier. Using the stored or retrieved password and/or list of devices, the neighbor may be validated. Nounce, time stamping, or other processes may be used to indicate trust.

More than one type of validation may be used for a given neighbor device. For example, the network device determines whether there is a common trust anchor, determines whether there is a certificate-based verification, determines whether an identity is valid, and determines whether a most recent certificate is expired. For example, if a network device receives a domain-specific X.509 certificate from a neighbor device, the network device validates the certificate structure and format. The certificate validation uses the root certificate and/or certificate chain of the issuer of the received certificate. If other types of credentials are received, for example a MD5 pre-shared secret, that information is validated accordingly.

The certificate does not necessarily have to be from the same domain as the receiving device. If both devices have a common trust anchor, the certificate may be validated. This makes it possible to validate the identity of devices belonging to other domains. It is up to the upper layer protocols to decide whether to establish a connection to the other device, even when the other device belongs to a different domain.

There are various processes for checking the identity of a neighbor, with various levels of security. Any process of validation using cryptographic identities may be used. The network devices are loaded with a pre-shared key. There may be subclasses in this category. For example, different methods provide for different levels. SUDI, 802.1x, Trustsec, or secure CDP (sCDP) types of validation may provide for different levels of validity. The validation relies on the network device performing the validation being part of a domain. In an autonomic network example, both autonomic devices may not have domain identification. The devices may exchange their SUDI information with an empty domain name. The devices may however validate their SUDIs mutually. This is a valid result, and is recorded in the neighbor table as such. So if there is no domain and/or ANRA in a network, the network may still form properly using default parameters. As another example, other factors associated with the validation may indicate a level of validity. A size or strength of encryption used, ability to check for revocation, access to resources outside the network device and/or network, the source of information used in validating, or other aspects may indicate validity.

Other validity determinations may be used instead of or as an alternative. For example, validation of simple identities (e.g., UDI) may be used. No validation may be used. Attempted validation with the result being a validation error may occur.

The validation begins with validation appropriate for the extracted credentials. Alternatively, the validation is performed from a highest level of validity to a lowest level, with each being attempted. If a highest level of validation fails, the next lower class of validation level may be used (e.g., attempting cryptographic validation, then attempting simple identities validation if cryptographic validation fails). Multiple classes of validation may be performed even with success in a higher level of validation.

The extraction and following validation is performed automatically without having to perform further interaction with the other devices. Any needed verifications, such as other keys from third parties, are stored on the network devices. Passwords, access lists, identities, or other information may be stored locally. A list of legitimate devices may be obtained in a number of different ways. The UDIs of purchased or otherwise acquired devices may be manually entered, loaded from a bill-of-sale, or scanned in from a barcode. In one embodiment providing for little manual maintenance, domain associated shared-key information is stored on the network device. This information is sufficient to authenticate another network device as part of the same domain. Third party verification information may be stored locally. The local device validates without a call outside the local device. Rather than consult with a centralized server, the validation occurs locally. Between extracting the credentials and validating the credentials, validating is performed without interaction for validating with other network devices. The information provided by a neighbor is validated as securely as possible given this restriction.

In alternative embodiments, remote access and associated calls are performed for validation. A request for authentication is sent to a server. The server returns information validating or that may be used to validate the neighbor device. Trusted party or a trust anchor service may indicate validity. The reliance or not on calls for validity may provide an indication of trust.

Other trust information may be gathered in validation. Periodically or as validation is performed, the certificate is checked for revocation. A revocation list is maintained at the local network device or a remote device. For example, a centralized revocation list is used to validate if the neighbor credentials have been revoked. Identities may be validated locally but a centralized authority may decide to not allow a specific device to connect to the domain (e.g., not allow a stolen device to connect). The revocation list is of devices for which authentication is revoked, such as compromised devices. The list is generated automatically or manually.

This verification is about validity, not trust. The neighbor discovery provides validity information. Whether or not a neighbor is trusted is an independent decision. It is possible that a cryptographically validated neighbor of the same domain is not trusted (e.g., if a device is compromised). It is also possible that a simple identity is trusted.

Figures 3, 6:
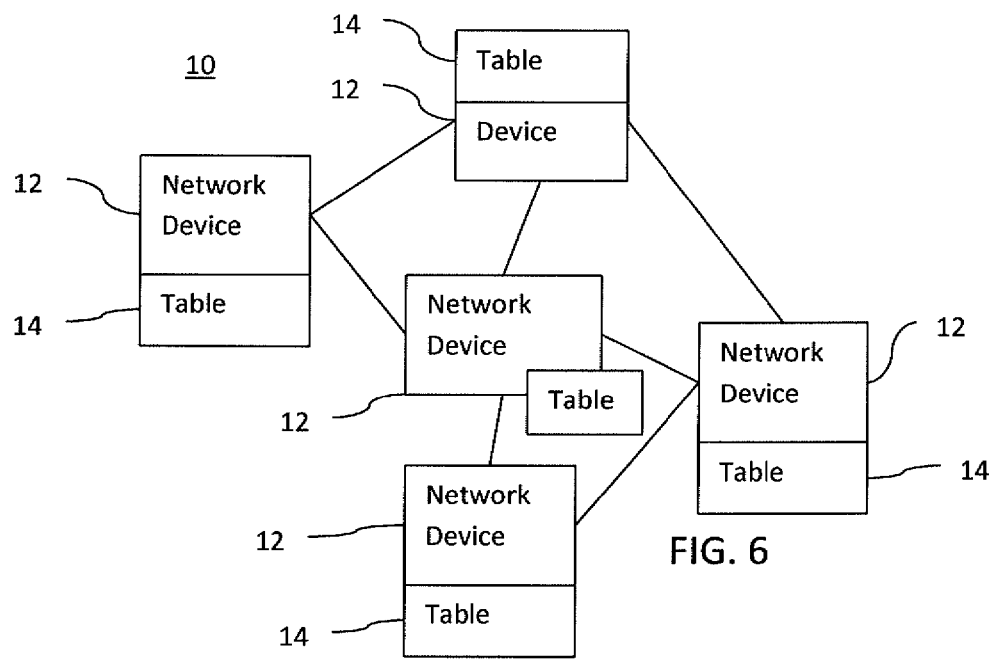
FIG. 3 is an example table of trust information.
FIG. 6 is a simplified block diagram of an example network environment for autonomic protection based on neighbor discovery.
Figure 7:
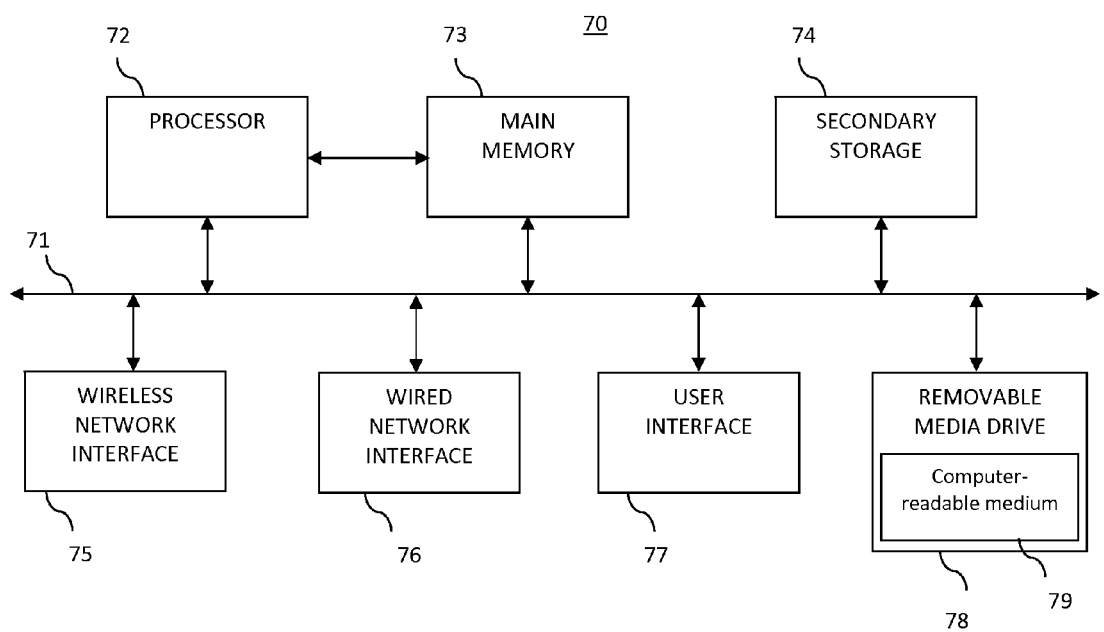
FIG. 7 is a block diagram of one embodiment of a network device for using neighbor discovery to create trust information for other applications.

The results of the validity operations are stored in act 36. The storage is at the network device. The results of the validation or validations are stored locally at the device that received the credentials and performed the validation. As represented in FIG. 6, tables 14 of trust information are created and stored at various network devices 12. The results may be stored remotely in other embodiments.

The results are stored as a table. Any format of table may be used, such as fields in a database. The results fields may account for various possibilities. Binary information may be stored, such as valid or not valid. Other outputs may be stored, such as a measure or an "error" result.

The table includes the level of validation for each of the neighbor network devices. Level is used to indicate a class or specific information about the validating, not a judgment or ranking. For example, the type of validation and the results (yes or no) of the validation are stored. Validity attributes may be stored to indicate the level. The result of local evaluation of the validity may provide information for a trust anchor (e.g., "have common trust anchor"; "do not have a common trust anchor"), whether the certificate is valid or not, whether the identity is valid or not, and/or freshness (e.g., "cert expired"; "cert fresh"; "unknown").

FIG. 3 shows one example table. In another example, a neighbor table is populated with information for any detected neighboring devices. For each neighbor device, the table includes entries for the neighbors identification (e.g., "router1.cisco.com"), where (e.g., port or interface) and/or when the neighbor device was discovered (e.g., "Fastethernet1/1", "12:37:33 Jan. 1, 2012"), the discovery method (e.g., "Autonomic SEND"), the credentials (e.g., X.509 certificate) and the results of the validation of these credentials (e.g., "Certificate valid", "CRL check passed"). The neighbor identification may include the host name and domain name of the device. Any possible discovery method may be identified, such as manual, L3 discovery, L2 discovery, or CDP. Any possible credentials may be identified, such as an X.509 certificate, a SUDI, or <empty>.

Other information reflective of trust may be stored. For example, the table includes the information about the neighbor (e.g., domain and identity), the received credentials (e.g., X.509 certificate), and the results of the validation. As another example, the method by which the validation information is obtained is stored. Other information may be provided, such as the use of a flounce, secure UDI, unsecure UDI, password, call or not to a remote verification server, check for revocation or not, or manufacturer of the device.

The results of the validation are used to determine the trust level of adjacent nodes or of traffic received on each interface. For example, if the adjacent node is not in the same autonomic network domain, traffic from that node to the entire network (e.g., other network devices in the same domain) is blocked. Using trust information, interfaces are classified. Any number of classifications and corresponding levels of security may be provided. In one embodiment, binary classification is provided. Inside and outside levels of security are used for securing the network. If the neighbor device and corresponding interface are outside the network (e.g., not trusted or not validated), greater or different level of security is provided than if the neighbor device and corresponding interface are inside the network (e.g., trusted and/or validated).

Devices which do not support validation or autonomic networking may be protected by more capable devices. The interfaces associated with a legacy device are flagged and the security level may be manually tagged as "inside," "outside," or other level of security. By labeling non-supporting devices within the network as "inside," the barrier of protection or security established by network edge devices is extended to these legacy devices inside the network. If the legacy device is an edge device, labeling the corresponding interface with a network device in the network as "outside" establishes protection for the rest of the network. Automatic or manual setting of the level of security for legacy devices is provided.

The receiving, validation, and storing of acts 32, 34, and 36 are repeated for various neighbor devices. The establishing act 24 of FIG. 1 is likewise repeated. The repetition results in validation information for each of the neighbors and corresponding interfaces in a table.

Each neighbor also creates their own table for the corresponding neighbors. The network device that created a table also sends neighbor discovery packages to neighbors for the neighbors to use in creating a trust table. The acts of FIG. 2 are performed by multiple, such as all, of the network devices in a network or domain. Similarly, the security is established by multiple of the network devices based on the validation or trust information determined through neighbor discovery.

Other information than trust information may be stored. For example, the capabilities of the neighbor device may be stored. The capabilities may also indicate trust, such as devices not capable of performing some operations indicating devices not intended to be connected to a given network.

The table may be modified. The validation may be performed each time neighbor discovery occurs. The occurrence may be based on a time trigger of the local device. The occurrence may occur whenever a neighbor discovery package is received. Other triggers may be used.

The modification may be to replace results. For example, a neighbor device may have had an invalid certificate. A neighbor discovery package may provide a new certificate, which is valid. The certificate and the validity are stored in the table instead of the old certificate and the invalid result.

The modification may remove results in act 38. Some aspect of the level of validity is removed. For example, the "valid" entry of a certificate is removed due to time. If a further certificate has not been received, the "valid" may be replaced with a blank or "invalid." Where repeating of the neighbor discovery does not provide an update or confirm current entries, old entries may be removed. On a regular basis, the information about a specific neighbor in the neighbor table is removed if no update has been received during a pre-defined timeout (e.g., 30 seconds). This timeout may vary based on the authentication protocol used. Rather than removal, a failure to update may trigger a request for authentication information. A directed neighbor discovery probe packet is transmitted. If no response is provided to the discovery probe packet, then the results may be removed. All or only some information may be removed. For example, FIG. 3 shows leaving the results of validity but removing timing information where an update has not occurred.

Referring again to FIG. 1, each or some of the network devices operates the security application locally. A given computer network device runs an instance of the security application. The different network devices also run instances of the security application. Rather than a centralized control or configuring of security, the security is configured locally.

The security protocol is at level three or higher of the TCP/IP stack. The protocol is at a higher layer than the neighbor discovery used to obtain the trust information. In other embodiments, one or more aspects of the security protocol are performed at level two.

The trust information is used by the security application to control communications over interfaces between the computer network device and a corresponding neighbor device. For example, the security application defines a security perimeter based on domain boundaries established from the trust information (e.g., use the valid identification of devices in the same domain to establish a boundary corresponding to "external" links). Different types of data may or may not be received from neighbor devices or operated on based on the security level.

The security protocol relies on the generically available trust information rather than performing separate coupled validation. The validation is not performed specifically for or by the security protocols, relying on the table instead. The receiving of authentication information from neighbor devices, determining validity of the authentication, and storing the results are performed decoupled from operating and establishing the security. The neighbor discovery provides the trust information. The security protocol includes criteria for determining trust from the trust information. The security protocol includes the trust judgments appropriate for the protocol.

In other embodiments, one or more aspects of validation are performed as needed by the security protocol. If the desired information is not available in the trust table, the security protocol may acquire the information. Some security protocols may use the neighbor table simply to identify potential neighbors. The security protocol may establish uni-directional communication with that device and perform a full validation step on any credentials passed using that security protocol rather than using the trust table.

In act 24, the security application sets the security based on the trust information. The information from neighbor discovery is accessed to determine results of credential validation. Other information indicating trust may be alternatively or additionally accessed. For example, verified domain membership information is accessed. As another example, the timing and/or interface used for validation is accessed. In yet another example, a method of validation, type of certificate, trust anchor, class of validation, and/or other information is accessed.

The trust information is accessed to make a trust judgment. For example, a verified domain membership and validity by cryptographic identity is required by the security protocol to label an interface as an "internal" connection. For another level of security, such as trusted external neighbor, the security protocol may not need verified domain membership but require validity by cryptographic identity. Other indications of trust may be used in the judgment, such as the timing of the validation and/or the type of discovery method.

The security protocol decides how to use the trust information and a level of security appropriate for a specific neighbor. For example in autonomic networking, a neighboring device with a valid domain certificate and which is a member of the same domain is considered to be trusted for establishing the neighbor device as part of the same network without further centralized or manual configuration. Using this trust judgment, the communication authority corresponding to the level of security is established. The level of validation reflected in the trust table is compared to a level of required trust for security.

Since the trust information is available, the level of security is established automatically. Manual and/or centralized configuration of security may be avoided or not provided. The network device and associated network are made secure without configuration or requesting trust information from devices other than the neighbor devices. The established level of security may be overridden manually by an administrator.

Figure 4:
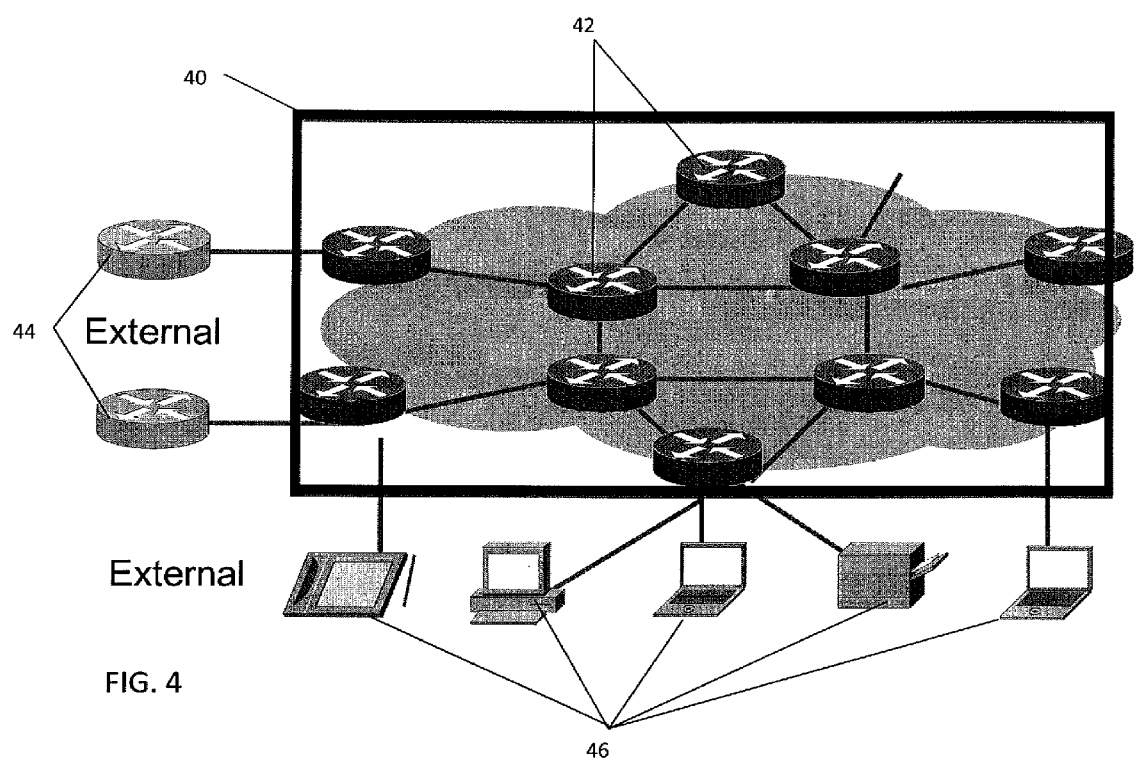
FIGS. 4 and 5 illustrate an example of establishing security differently for internal and external interfaces.

One network device may have settings for multiple security levels. A network device may connect with multiple neighbor devices. On layer 2, the connection is a direct connection. Each link or connection corresponds to a different interface of the given network device. The security level is set for each interface or link with a neighbor device. For example, FIG. 4 shows an example network 40 of devices 42. The devices 42 and corresponding network 40 may connect with external network devices, such as external servers 44 and/or external user devices 46. For a given network device, the interfaces may connect to only internal devices 42. For edge internal devices 42 of the network 40, one or more interfaces may each connect with one or more external devices 44, 46 and one or more interfaces may each connect with internal network devices 42.

Using trust information from neighbor discovery, the security level appropriate for the interfaces is determined and implemented. The security is established to make networking devices 42 of the network 40 unreachable, reachable with more restrictive limitations, or otherwise protected from external devices 44, 46 while limiting security restrictions on internal communications. The internal and external labels are relative to the network 40.

Figure 5:
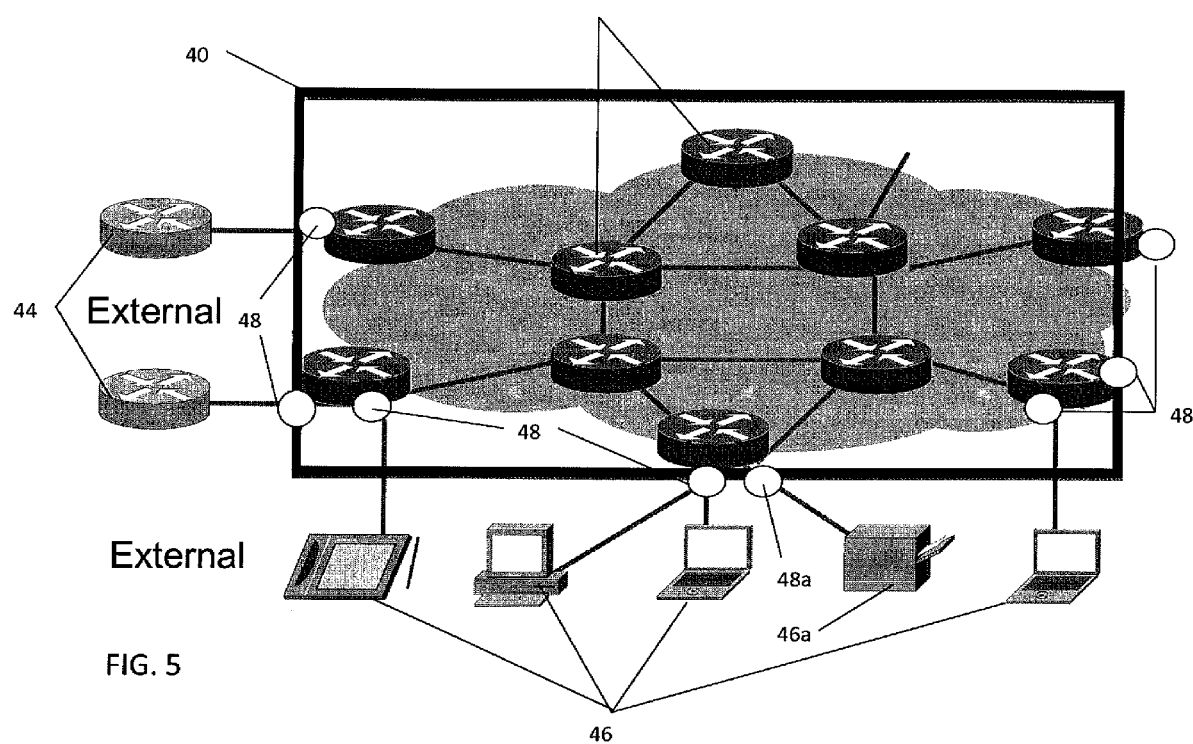

Using the neighbor discovery information, the border of the network 40 is determined. Any interface connected with a neighbor with a different domain and/or lack of validation is a connection to an external device. Other information may be used to determine external from internal. Setting security for all such interfaces results in a border protecting the network. The components inside the network are protected by the security implemented for interfaces at the edge of the network. FIG. 5 shows an example with external interfaces 48 having a different security level than internal interfaces. By automatically setting the security level higher for network devices 42 on the border of the network 40, a dynamic security barrier protects those network devices 42 which are on the inside of the border.

In one embodiment, the level of security to be applied for a given interface is set based on the level of trust with the corresponding neighbor device. The interfaces with trusted neighbors are set to a security level for internal connections, and the interfaces with non-trusted neighbors are set to a security level for external connections. Connections with trusted neighbors, but where the trusted neighbor may have less security capability, may be set to external security levels or another higher level of security to protect the rest of the network. "Internal" is a security level label for interfaces where there are autonomic neighbours or neighbours participating in adjacency discovery with validation. "External" is a security level label for interfaces where validation or other criteria are not met. Other levels and corresponding labels may be used. Different levels of security than two (e.g., internal and external) may be used, such as for different levels of validation. The security level is determined for each or all interfaces with another network device.

The security level is determined automatically and locally. A given network device sets the security level for the interfaces of the network device without centralized configuration and/or manual input. By performing the generation of trust information and security utilization of the trust information in different network devices, security throughout the network and/or between networks is established using local decisions.

A combination of manual configuration and automated setting of security levels may be used. For example, the security application may first check for a manual override or setting of the security level for an interface. If a manually configured label exists for the interface and/or neighbor network device, the manually set trust, security level, or security modification is used. Otherwise, the automatic setting is used.

Each security level corresponds to a security policy. A level of security is established by different settings of a same security protocol, different security protocols, different combinations of security protocols, or combinations thereof. The policy for an internal level of security is different than the policy for the external level of security, such as using a different collection or combination of security protocols for the external than for the internal levels. One or more protocols may be common to both and have the same or different settings (e.g., more or less restrictive rate limits).

In one embodiment, the internal level of security generally corresponds to a trusted neighbor (e.g., valid X.509 certificate), so most communications are to be allowed. Some attacks may originate from within a network. To provide security while limiting or protecting against such attacks, a rate limit is used. For example, Configure Control Plane Policing (CoPP) and/or Local Packet Transport System (LPTS) are enabled as part of the internal level of security to protect the device against any potential internal attacks received at that interface in a control or OAM virtual network. Internal devices will be able to interact with other internal devices without any or with few limits. For data plane traffic, the security may have no rate limits. Additional, different, or fewer security protocols may be used for the internal level of security.

The various internal interfaces throughout the network 40 are protected from external attacks by the external level of security at the edges or border of the network 40. In one embodiment, the external level of security generally corresponds to an untrusted neighbor (e.g., different domain or no validation), so most communications are not to be allowed. Given the lack of trust, the external level of security may be a collection of multiple security protocols and/or more restrictive settings of a security protocol as compared to the internal level.

The policy for external security corresponds to blocking or dropping network traffic addressed to an internal node or network device and to the border or edge network device (e.g., blocking ingress traffic). In one embodiment, the external level of security implements automatic backbone protection (ABP) (see U.S. Pat. No. 7,639,688. Routing information is used to classify received traffic as internal or external. Other approaches may be used.

Traffic to be carried across or through the network (e.g., passing through but not executed by the network devices of the network 40) may be allowed. Exceptions may be provided by manual configuration, such as from permissions in control plane protocols. Other exceptions may be automatically provisioned, such as allowing neighbor discovery data and/or a small rate of internet control message protocol (ICMP) traffic.

In one embodiment, a forwarding information base (FIB) labeling algorithm secures the external interface. The FIB labeling algorithm includes, for each prefix: if the prefix derived from IGP: IGP bit=0, else IGP bit=1. If the Prefix nexthop=Receive and Destination interface label=External, FIB Connected External label=external (1), else FIB Connected External label=0. The packet forwarding algorithm provides that if packet label=External AND destination interface label=internal, the packet is dropped. If (ingress interface label=internal AND FIB Connected External label=external), the packet is dropped. Otherwise, the packet is allowed. Other approaches may be used.

The external level of security may include other security protocols. For example, ABP may not exclude an edge network device from receiving and forwarding traffic destined for a different edge interface of the same network 40 (i.e., traffic on an external interface to be routed to another external interface on the "other" side of the network). Egress interface protection is provided. External interfaces may not be reachable locally to the external device. For example, the external interface 48a blocks traffic from the external device 46a. However, other external interfaces 48 are reachable remotely from the external device 46a (e.g., subnet is routed). This is an attack vector. To secure against this attack vector, further protection is added. If a packet is destined to an "external" interface 48, and if the packet came in on an "internal" interface, the packet is dropped, making the external face unreachable. Using the concept of where the packets come from (external/internal), it is possible to control access to external interfaces 48.

Another example protocol implemented for the policy on external interfaces is rate limiting traffic received on the external interface. In one embodiment, CoPP and/or LPTS are used, but other rate limiting approaches may be used. The settings for the rate limiting are different for the external interface than for an internal interface. For example, all traffic arriving at the external interface has a lower priority than traffic arriving at "internal" interfaces. This differential LPTS is like LPTS, but prioritizes received traffic from "inside" interfaces over "outside" traffic. Additionally, other security measures, like not allowing fragmented IP packets, may be implemented. The ingress interface is accounted for in rate limiting at the network device. The rate limit for external interfaces may be less than for internal interfaces.

The external policy may allow required control plane protocols on external interfaces without or with different rate limits. For automatic security, the configuration is generic and not bound to certain interfaces. Existing LPTS policies are used. The border gateway protocol (BGP) may be sufficiently secure, so may be allowed. To limit BGP attacks, distinguishing external from internal interfaces and queuing separately may be used. For the network time protocol (NTP), the default or other LPTS policies for NTP may be used. For the internet control message protocol, the default or other LPTS policies can be used. The configuration is interface specific. The default policers may be dropped to zero for the label distribution protocol (LDP), interior gateway protocols (IGPs), protocol independent multicast (PIM), and resource reservation protocol (RSVP). For Open Shortest Path First (OSPF) protocol, the LTPS default or other OSPF policers may be set to zero as the OSPF policers are only used for unknown traffic. This may in effect block OSPF traffic from unauthorized devices.

Other security protocols for the external interface may include a filter. The filter drops traffic except autonomic network discovery packets or other exceptions to the network device. Other exceptions may include traffic for network protocols that have been previously defined by the administrator. Those network protocols are protected against denial of service attacks using rate limiting.

Other possibilities include re-coloring precedence 6-7 to 0 on ingress for quality of service (QoS). The transit packet should not be precedence 6/7. Automatic server discovery security may be provided, such as authentication, authorization, and accounting, network time protocol, policy, syslog, or NetFlow related security. Autonomic monitoring may be used, such as NetFlow, Syslog, or rate limiting of syslog messages to a network operations center. Automatic anti-spoofing, L2 security, TrustSec integration, and/or other security best practices may be enabled.

The setting of security in act 24 of FIG. 1 is dynamic. As the network changes or connections change, the security and corresponding security perimeter adapts. The generation of trust information of act 20 is performed periodically or in response to a trigger. By repeating the receiving of act 32 and the validation of act 34 of FIG. 2 again, the neighbor information and corresponding trust information database is updated. Whenever there is a change in the autonomic neighbors table (e.g., new neighbors and/or neighbors disappear), the security application determining "inside" vs. "outside" is executed again and the relevant protection mechanisms are implemented.

The change may occur even where the same neighbor is provided on an interface. The level of security may change for an interface and corresponding neighbor where the repetition fails to update the level of validation. The neighbor may no longer be trusted, so the appropriate security level is assigned.

The net result is to establish a dynamic barrier, making the network inaccessible from the outside and at the same time, protect against denial of service attacks from both outside and inside. When the network changes and nodes are added and/or removed, the neighbor table is automatically updated. The security application recalculates the levels of security to be applied, potentially changing which interfaces are defined as "internal" or "external."

In act 26, network wide security is implemented. In addition to protecting the network by securing interfaces, adaptive security is provided. Information may be shared between network devices, allowing for change of security level at one device based on security information from other devices. For example, information about detected security incidents and/or attacks is shared between neighbors using the internet control protocol.

This shared information may be used to automatically activate distributed denial of service protection. By detecting a denial of service attack at one or more nodes, other nodes may alter the security at all, at external, or at internal interfaces to provide more restrictive rate limiting (e.g., less rate and/or priority for types of data). The change may be for all interfaces or just interfaces connected with the devices under attack.

The shared information may be used to implement self-protection or self-healing. For example, an internal interface is set to an external level of security where the corresponding internal neighbor reports an attack. The shared information may be used to isolate network devices under attack from other devices, such as blocking even internal traffic from devices under attack. As another example, the levels of security adapt to resort back once an attack is over.

FIG. 6 shows an example computer network 10 with network devices 12 for automatic provision of security based on neighbor discovery. The network 10 implements the method of FIG. 1, the method of FIG. 2, or other methods for automating security configuration for interfaces using neighbor discovery information. The network 10 includes two or more network devices 12. In one embodiment, the network 10 includes tens, hundreds, thousands, or more of the network devices 12. Network device is meant to encompass any computing device or network element, such as servers, routers, personal computers, laptops, smart phones (e.g., cell phones with computing capabilities), personal digital assistants, client computers, network appliances, switches, bridges, gateways, processors, load balancers, wireless LAN controllers, firewalls, or any other suitable device, component, element, or object operable to affect or process electronic information in a network environment.

The network 10 may be for a single domain (e.g., cisco.com) or multiple domains (e.g., cisco.com and lskiplaw.com). For example, the network may be a wide area network, local area network, intranet, extranet, wireless local area network, virtual local area network, or combinations of networks for one or more companies.

The network 10 may be relatively static, such as the same network devices 12 being provided over minutes, days, weeks, or years. Network devices 12 may be occasionally added or replaced. In other embodiments, the network 10 is dynamic, such as allowing network devices 12 to be added or removed frequently. For example, personal computers, tablets, or smart phones may connect or disconnect from the network 10 throughout a day.

The network devices 12 are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

For communicating with each other, the network devices 12 perform neighbor discovery. Neighbors include direct neighbors, such as network devices 12 connected together by one hop or a single link. Neighbors may include or exclude indirect neighbors, such as network devices 12 connected together by more than one hop or over multiple links with one or more intervening network devices 12. The neighbors may be neighbors either on layer 2 (link layer) or on layer 3 (network layer).

The neighbor discovery is performed by all or just some of the network devices 12. The network devices 12 transmit neighbor discovery packets. For example, each network device 12 broadcasts neighbor discovery packets periodically. The network devices 12, receiving the packets, may perform neighbor discovery for themselves. Each network device 12 determines its own neighbors from the packets transmitted from the neighbors.

Different restrictions in communications over the links may exist between network devices 12 of the different domains. Restrictions may exist for communications between network devices 12 of a same domain. Depending on the level of trust, different security may be implemented. The levels of security allow or disallow communications depending on the type data, purpose of communication, and/or other factors. Trust information is used to automatically establish security on interfaces between network devices 12.

FIG. 3 is a simplified block diagram of an example network device 12, such as a general or special purpose computer. The example network device 70 corresponds to network elements or computing devices that may be deployed in the network 10. The network device 70 includes software and/or hardware to perform any one or more of the activities or operations for creating trust information from neighbor discovery and using the trust information to provision security on interfaces.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 12. For example, the network device 70 may include another processor and/or not include the secondary storage 74 or removable media drive 78. Each network device 12 may include more or less components than other network devices 12.

The main memory 73 may be directly accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

One or more of the memories 73, 74, 79, or another memory store information about communicatively connected devices. For example, the main memory 73 stores the table of FIG. 2. The trust information, such as validity, timing, certificate, and discovery method, are stored for each neighbor. The stored information may be used to determine a level of trust associated with an interface.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. Thus, computer-readable medium includes any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like.

The processor 72, which may also be referred to as a central processing unit (CPU), is any general or special-purpose processor capable of executing machine readable instructions and performing operations on data as instructed by the machine readable instructions.

The processor 72 performs neighbor discovery. The processor 72 determines the identities, the certification validities, the timings, the discovery methods, and/or other information during neighbor discovery of the devices. The determination of validity may be made without calls to a remote server or database. The processor 12 automatically discovers neighbors, potentially of different domains, and validates the credentials locally. The access list or other validity information is stored locally, such as populating the list through trusted network devices 12. Alternatively, the validity is determined with one or more calls to a remote server, such as an authentication server.

The local trust table is used by a security application. The processor 72 implements security protocols for the various interfaces based on the corresponding validity information. By providing the trust table for use by different security protocols, the protocols may be free of validation determination other than calls to values determined by the processor during the neighbor discovery. This approach decouples discovery and validation of identity from the usage of that information.

In one embodiment, the trust information is used to secure communications in autonomic networking. Autonomic networking establishes and provides the network 10 with little or no manual user configuration. Rather than centralized control, the network devices 12 are configured to operate independently to form and maintain the network 10. The local network devices 12 make decisions based on pre-determined criteria and/or expressions of intent or goals regarding the network provided from a centralized authority. To interact in implementing localized control, the autonomic network devices 12 create a control plane for secure communications between devices. The control plane is a separate communications path for handling network connectivity and network creation separately from communications using the network. The autonomic networking may allow new nodes to be added to the network without manual configuration from a central or network management node. The control plane is established and the new node added through neighbor discovery and resident configuration.

Neighbor discovery is part of an autonomous network. Neighbor discovery is the first step in autonomic interactions between network devices. An autonomic device automatically, on first boot, enables all interfaces ("no shut"), and starts neighbor discovery on each interface. One goal of the neighbor discovery is to generate a table that shows identification for each adjacent autonomic device and validity thereof. The autonomic device performs neighbor discovery with adjacent autonomic devices.

During neighbor discovery, other traffic or communications are blocked. Some control communications or other exceptions may be provided.

Neighbor discovery may not provide a topology, but does provide trust information. Neighbor discovery does not make any judgment on the trust for each neighbor. Factual information (e.g., the validity and/or verification level of that validation) is provided. The security application uses the trust information to judge trust. The trust information is used to determine whether other network devices 12 are within the same domain or not and limit communications accordingly. The interfaces of the network device 12 are secured.

Each interface is secured based on the level of trust. For example, interfaces with trusted neighbors (e.g., valid and same domain) are secured as internal interfaces. Interfaces with external or non-valid devices are secured as external interfaces. The type, settings, or collection of protocols implemented for internal interfaces is different than for external interfaces.

Neighbor discovery is repeated. The newly discovered information is reviewed to reassign security. The security application dynamically responds to changes in the network, updating the securing of the interfaces based on the updated neighbor discovery information.

The wireless and wired network interfaces 75 and 76 may be provided to enable electronic communication between the network device 70 and other network devices 12 via one or more networks. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   receiving, by a computer network device during neighbor discovery, a neighbor discovery package from a neighbor network device;
   determining, by the computer network device, a level of validation of the neighbor network device from the neighbor discovery package, the level of validation being for an interface of the computer network device connecting to the neighbor network device, extracting an authentication credential from the neighbor discovery package for the neighbor network device, and validating the authentication credential without interaction for the validating with any other network device between the extracting and the validating;
   automatically establishing a level of security for the interface of the computer network device connected with the neighbor network device based on the level of validation, different levels of security, including external and internal levels of security, being available for different levels of validation for the interface, in which all other communications from the neighbor network device are blocked until the level of security is established;
   in which the external level applies a first security policy restricting traffic addressed to an internal node and to network traffic an internal interface destined to an external interface the external interface corresponding to the neighbor network device of a different domain than the computer network device; and
   in which the internal level allows network traffic without the limiting of the first security policy from the neighbor network device of a same domain as the computer network device.

2. The method of claim 1 wherein receiving the neighbor discovery packages comprises receiving the neighbor discovery package from the neighbor network device at a layer 2, the neighbor network device being directly linked to the computer network device.

3. The method of claim 1 wherein determining comprises populating a trust table for a plurality of neighbor network devices including the neighbor network device, and wherein establishing the level of security comprises accessing the level of validation for the neighbor network device from the trust table.

4. The method of claim 1 wherein establishing comprises selecting between the internal level of the security and the external level of the security, the internal and external being relative to a network.

5. The method of claim 4 wherein establishing comprises establishing the level of security as the internal level, the internal level corresponding to allowing the network traffic without a rate limit.

6. The method of claim 4 wherein establishing comprises establishing the level of security as the external level, the external level corresponding the first security policy being to block network traffic addressed to the internal node, blocking the network traffic from the internal interface destined to the external interface, and rate limiting the network traffic.

7. The method of claim 4 wherein establishing comprises setting rate limiting differently for the internal level than the external level.

8. The method of claim 1 further comprising
   repeating the receiving and determining at a later time; and
   changing the level of security for the neighbor network device where the repeating does not update the level of validation for the neighbor network device.

9. The method of claim 1 wherein the level of security is established for an interface of the computer network device with the neighbor network device;
further comprising:
repeating the receiving, determining, and establishing by the computer network device for other interfaces with other neighbor network devices.

10. The method of claim 1 further comprising:
sending a neighbor discovery package for the computer network device to the neighbor network device; and
performing the receiving, determining, and establishing locally at the neighbor network device.

11. The method of claim 1 further comprising:
receiving, by the computer network device, security information from the neighbor network device; and
changing the level of security at the computer network device as a function of the security information.

12. Logic encoded in one or more non-transitory computer-readable media that includes code for execution and when executed by a processor is operable to perform operations comprising:
generating a trust information database about other devices connected to interfaces at a local device;
consulting the trust information database at the local device by a security application running on the local device;
determining a level of validation for the other devices connected to interfaces at the local device;
extracting authentication credentials for the other devices connected at the local device, and validating the authentication credentials without interaction for the validating with the local device between the extracting and the validating;
setting, automatically by the security application of the local device, security for each of the interfaces as a function of the trust information, the security for each of the interfaces selected from between at least first and second policies, the first policy being a collection of security protocols, the second policy being one or more security protocols different in combination than the collection of the first policy, in which all other communications from a neighbor network device are blocked until the level of security is established;
in which the external level applies a first security policy limiting traffic addressed to an internal node and to network traffic an internal interface destined to an external interface the external interface of a different domain than the local device; and
in which the internal level allows network traffic without the limiting of the first security policy the internal level comprising neighbor network devices of a same domain as the local device.

13. The logic of claim 12 wherein generating the trust information comprises receiving authentication information as part of neighbor discovery and performing validation at the local device without a call outside the local device, and, prior to the setting, blocking network traffic other than the authentication information and administrator defined network protocols.

14. The logic of claim 12 wherein consulting the trust information database comprises consulting for a result of credential validation and for a domain membership for the first of the other devices.

15. The logic of claim 12 wherein setting comprises setting without requesting trust information from a remote authority.

16. The logic of claim 12 further comprising:
updating the trust information database;
repeating the consulting and setting based on the updated trust information database.

17. An apparatus comprising:
a memory operable to store information about a plurality of communicatively connected devices; and
a processor configured to determine a level of validation for neighbors connected on a plurality of interfaces based on neighbor discovery, to extract authentication credentials for the neighbors, to validate the authentication credentials without interaction between the extraction of the authentication credentials and the validation of the authentication credentials, to automatically secure a first of the interfaces as a connection internal to a network based on the level of validation, and to secure a second of the interfaces as a connection external to the network based on the level of validation, the securing being different for the internal and external connections, in which all other communications from a neighbor network device are blocked until a level of security is established;
in which the connection external to the network comprises traffic addressed to an external node, and applies a first security policy limiting traffic addressed to an internal node and to network traffic an internal interface destined to an external interface the external interface corresponding to the neighbor network device of a different domain than the network; and
in which the connection internal to the network allows network traffic between internal nodes corresponding to the neighbor network device of a same domain as the network without the limiting of the first security policy.

18. The apparatus of claim 17 wherein the processor is configured to block traffic on communications interfaces except for the neighbor discovery, and to update the securing of the interfaces as a function of updating neighbor discovery.

* * * * *